United States Patent [19]

Spademan

[11] 3,853,127
[45] Dec. 10, 1974

[54] ELASTIC SEALING MEMBER
[76] Inventor: Richard G. Spademan, 933 Addison Ave., Palo Alto, Calif. 94301
[22] Filed: Apr. 3, 1973
[21] Appl. No.: 347,438

[52] U.S. Cl. .............................. 128/214.4, 277/237
[51] Int. Cl. ..... A61j 1/06, B65d 53/00, B65d 39/00
[58] Field of Search .... 128/214.4; 215/047, DIG. 3; 277/237

[56] References Cited
UNITED STATES PATENTS

| | | | |
|---|---|---|---|
| 1,180,665 | 4/1916 | McElroy | 215/047 |
| 1,976,589 | 10/1934 | Trickey | 277/237 X |
| 2,115,035 | 4/1938 | Morgan | 215/047 |
| 2,447,340 | 8/1948 | Jackson | 277/237 X |
| 2,896,629 | 7/1959 | Warr | 215/047 X |

Primary Examiner—Channing L. Pace
Attorney, Agent, or Firm—Warren M. Becker

[57] ABSTRACT

A method and apparatus is provided for closing a perforation in an elastic sealing member upon the withdrawal of a penetrating instrument therefrom.

Means are provided for generating a non-uniform stress in the member in a plane substantially normal to the longitudinal axis of penetration. The stress is generated by utilizing a sealing member having a first surface of a first configuration for sealing against a second surface having a second configuration. For use in or about a passageway having a wall surface configuration closely identical to that of a facing surface of the sealing member, a sleeve having a different surface configuration is used between the sealing member and the wall surface. In this manner effective resealable plugs, diaphragms and combination seals are provided.

16 Claims, 28 Drawing Figures

PATENTED DEC 10 1974
3,853,127
SHEET 1 OF 2

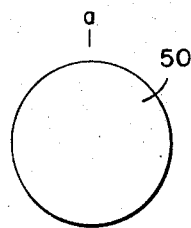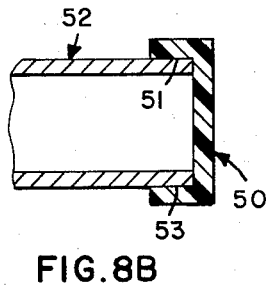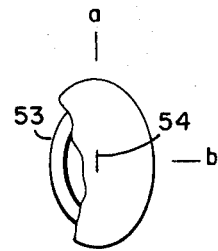
FIG.8A　　　　FIG.8B　　　　FIG.8C
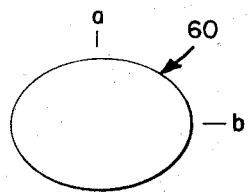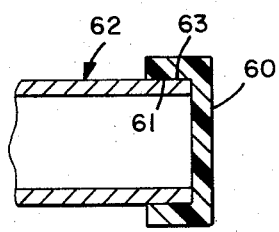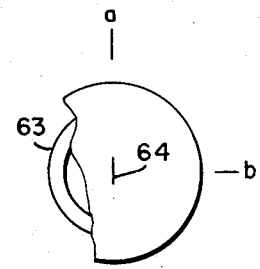
FIG.9A　　　　FIG.9B　　　　FIG.9C
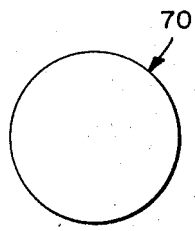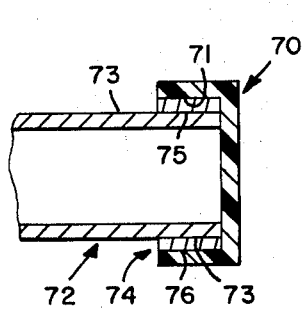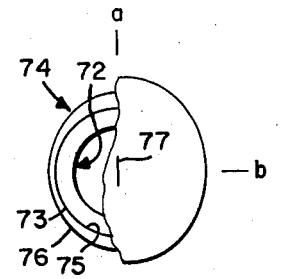
FIG.10A　　　　FIG.10B　　　　FIG.10C

ELASTIC SEALING MEMBER

BACKGROUND OF THE INVENTION

The present invention relates to sealing members in general and in particular to resealable elastic sealing members such as illustrated in U.S. Pat. No. 3,313,299, entitled, Intravascular Catheter with Coaxial Puncturing Means.

Resealable sealing members for closing bottles, tubes and the like have been known for years. These members have in common a construction that includes an elastic substance which allows penetration by a sharp needle or the like for a short period of time to introduce or remove liquids. The geometry of these members is such that approximately uniform tension or compression is applied to the member. This conventional arrangement is intended to allow the member to resume its original shape, and thus reseal, when the penetrating instrument is removed. However, the perforation caused by the penetrating instrument may take a set with consequent leakage of fluid through the perforation when a large caliber needle or the like has remained in a position of penetration for an extended period of time.

SUMMARY OF THE INVENTION

Accordingly, a principal object of the present invention is a method and apparatus which obviates the aforementioned sealing member leakage problem. Means are provided for developing unequal deformation stress in the member. In general, the member is secured in a passageway or to the rim or other holding portion of a bottle or tube. More specifically, the unequal stress is transmitted to the area of penetration of the member penetrated by a needle or the like. Upon removal of the penetrating instrument, any resulting perforation will change configuration and close by relative elongation and/or compression in accordance with the direction and magnitude of the induced stress.

In one of the preferred embodiments, a latex reseal plug is provided with a generally circular cylindrical configuration. A retaining part of the tube or bottle is provided with a non circular configuration. A greater compressive force is thus applied to the plug in one direction than in another direction in the same plane. Therefore, when a penetrating instrument is removed from the reseal plug, any resulting perforation will tend to compress in one direction and elongate in another direction. With forces of appropriate magnitude and direction the perforation will close and prevent the leakage of fluid through the plug.

In another embodiment of the present invention there is provided a resealable elastic member under tension. Means are provided for inducing in the member essentially normal to the axis of penetration of the member by a needle or the like a stress greater in one direction than in another. Upon withdrawal of the penetrating instrument from the member the induced unequal stress will elongate any perforation resulting from the penetration. With a stress of appropriate magnitude and direction, the perforation will close and prevent the leakage of fluid through the perforation.

Similar means are used for effectively sealing members under both compressive and tensile stress. Also, appropriately shaped sleeves are used for generating the necessary non-uniform stress in the sealing members where the members and the passageways with which the members are used have substantially identical facing surfaces.

These and other objects, features and advantages of the present invention will be apparent from the following detailed description of the accompanying drawing.

DESCRIPTION OF THE DRAWING

FIGS. 4A, 5A, 6A, 7A, 8A, 9A and 10A are elevation views of elastic sealing members in accordance with the present invention.

FIGS. 4C, 5C, 6C, 7C, 8B, 9B, and 10B are partial cross-sectional views of a tubular member and sealing member in accordance with the present invention.

FIGS. 4D, 5D, 6D, 7D, 8C, 9C and 10C are end views of FIGS. 4C, 5C, 6C, 7C, 8B, 9B and 10B, respectively.

DETAILED DESCRIPTION

Figure 1:
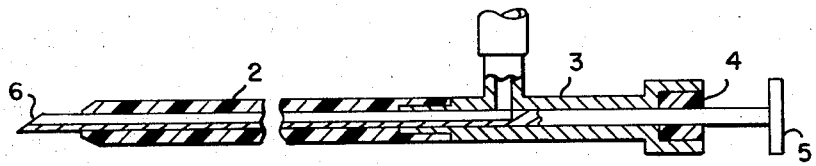
FIG. 1 is a cross-sectional view of a prior known apparatus using an elastic sealing member with a penetrating instrument in a position of penetration.
Figure 2:
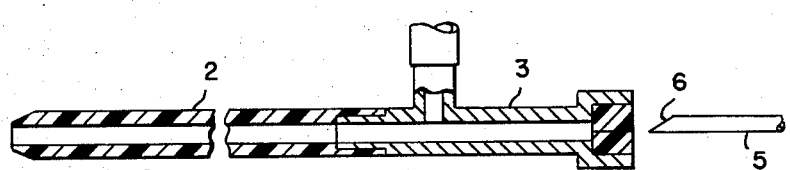
FIG. 2 is another view of the apparatus of FIG. 1 with the penetrating instrument withdrawn.
Figure 3:
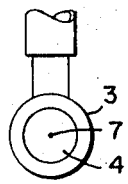
FIG. 3 is an end view of FIG. 2 wherein an aperture caused by the penetrating instrument is enlarged for clarity of illustration.
Figure 4A:
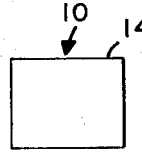
Figure 4B:
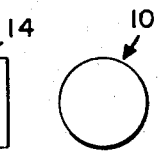
FIGS. 4B, 5B, 6B and 7B are end views of FIGS. 4A, 5A, 6A and 7A respectively.
Figure 4C:
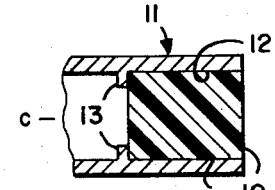
Figure 4D:
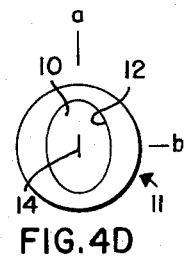
Figure 5A:
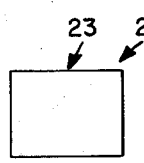
Figure 5B:
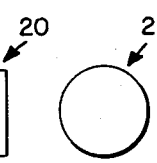
Figure 5C:
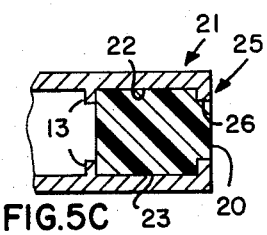
Figure 5D:
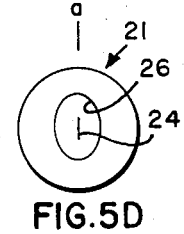
Figure 6A:
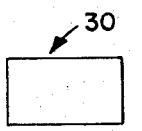
Figure 6B:
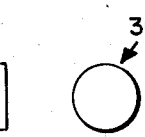
Figure 6C:
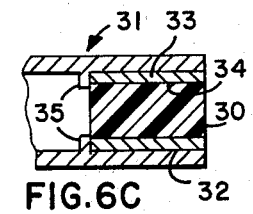
Figure 6D:
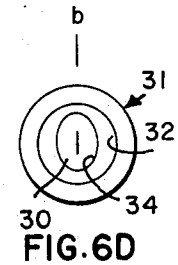
Figure 7A:
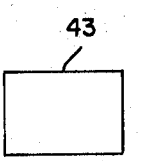
Figure 7B:
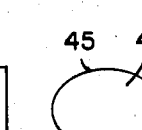
Figure 7C:
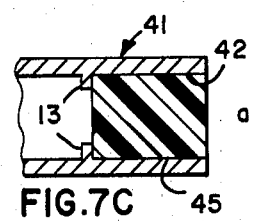
Figure 7D:
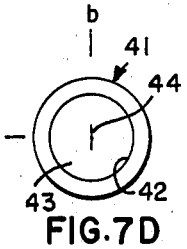

Referring to FIGS. 1, 2 and 3, there is shown a prior known catheter placement unit, the details of which are described in U.S. Pat. No. 3,313,299, comprising a flexible hollow tubular catheter 2 coupled at one end to a hub 3. An elastic sealing member 4 is provided in the opposite end of hub 3. A portion of sealing member 4 (not shown) may extend over and about the end of hub 3 in which case one part of member 4 would be typically under compression and another part would be under tension. These latter parts of the member would then serve as an additional means for retaining member 4 on or within hub 3. To maintain catheter 2 rigid for insertion in a vascular channel or other body cavity, there is further provided a substantially rigid or stiff penetrating instrument 5, such as a needle or the like. Needle 5 is provided with a sharpened point 6 to facilitate placement of the catheter.

In the manufacture, distribution and sale of the catheter placement units, it is the practice to package the units with needle 5 in a position of penetration as shown in FIG. 1. Unfortunately, it has been discovered, after a time, especially with larger caliber needles, such as 18 gauge and larger, a perforation caused by needle 5 in 4 may take a set. That is to say, an aperture or perforation 7 is created in member 4 by the needle 5 as illustrated in FIG. 3 which does not close entirely upon withdrawal of the needle 5 as shown in FIG. 2. Coring of member 4 upon penetration by needle 5 is also suspected as a contributing factor. In any event, when such occurs, leakage of IV fluids and blood through aperture 7 may occur.

To insure complete closure of a perforation in member 4 upon withdrawal of needle 5 therefrom there is provided in accordance with the present invention a method and a means for generating or otherwise inducing a non-uniform stress in member 4 in a plane substantially normal to the longitudinal axis of penetration.

Referring to FIGS. 4A-4D, there is provided a penetrable elastic sealing member 10 having a generally circular cylindrically shaped exterior surface 14. Member 10 is inserted in a tubular member 11 having a generally non-circular cylindrically shaped bore 12. Member 11 may be a tube, a bottle or the like. Interior of member 10 and extending radially inwardly of bore 12 is a shoulder or plurality of fingers 13 against which member 10 abuts. Alternatively, or in addition to shoulder 13, member 10 may have an extension (not shown) which extends over and about the ends of tubular member 11 for retaining member 10 in its intended position as shown during the introduction and withdrawal of a penetrating instrument.

A geometric distortion of member 10 occurs upon insertion in member 11 which due to the different facing surface configurations generates a first force of a given magnitude generally along a first axis a and a second force of different magnitude along a second axis b in a plane substantially normal to a longitudinal axis c of the member. An aperture or perforation 14 created by penetration of member 10 by a penetrating instrument is upon withdrawal of the instrument caused to be elongated and compressed by the interiorly directed unequal forces for closing the perforation.

In another embodiment of the present invention, there is provided, as shown in FIGS. 5A-5D an elastic member 20 having a circular cylindrically shaped exterior surface 23. Member 20 is inserted in a tubular member 21 having a conventional circular cylindrical bore 22. Member 20 is retained in its intended position, as shown, by a non-circular shoulder 25 having a non-circular interior surface 26. Shoulder 25 further serves to cause unequal deformation forces in the member. Shoulder 25, while shown at the end of bore 22, may also be located intermediate the ends of member 20. When so located, shoulder 13 may be omitted.

As described with respect to member 10, an aperture 24 created in member 20 by a penetrating instrument will upon withdrawal of the instrument elongate along an axis a and close under the influence of the non-uniform stress so generated in the member.

Referring to FIGS. 6A-6D, there is provided an elastic member 30 identical in shape to member 20. Member 30 is inserted in a tubular member 31 having a circular cylindrical bore 32. A sleeve 33 having a non-circular cylindrical bore 34 is provided for receiving plug 30. Plug 30 and sleeve 33 are inserted in member 31 and butted against a shoulder or plurality of interiorly directed fingers 35. Shoulder 35 is typically deeper than shoulder 13 for engaging both sleeve 33 and plug 30.

The interior bore 34 of sleeve 33, which is used in conjunction with tubular members and plugs of conventional cylindrical design, will generate forces of unequal magnitude in plug 30 along axes a and b as described above with respect to FIGS. 4A-4D and FIGS. 5A-5D.

For use in a tubular member 41 having a circular cylindrical bore 42 there is provided, as shown if FIGS. 7A-7D, an elastic member 43 having a generally non-circular cylindrical exterior surface 45. Upon insertion in bore 42 member 43 will compress along an axis normal to its longitudinal axis. Upon withdrawal of a penetrating instrument from member 43, a perforation 44 will elongate and close along an axis normal to the axis a due to the non-uniform stress induced in the member.

In general, substantially the same methods and means as described above are used in accordance with the present invention for generating non-uniform stress in a sealing member under tension.

As shown in FIGS. 8A-8C, there is provided a member 50 with a circular cylindrical wall 51 for sealing over the mouth of a tubular member 52 having a non-circular cylindrical exterior wall surface 53. A greater tension is thus created in member 50 along an axis a than along an axis b. This non-uniform stress will elongate a perforation 54 in a direction corresponding to axis a closing the perforation.

As shown in FIGS. 9A-9C, there is provided an elastic member 60 having a non-circular cylindrical wall 61 for sealing over the mouth of a tubular member 62 having a circular cylindrical exterior surface 63. When member 60 is installed on tubular member 62, it is stretched a greater amount along its axis a than along its axis b. The non-uniform stress is thus generated in member 60 and will elongate and close a perforation 64 in the direction of axis a.

In a further embodiment of the present invention, there is provided as shown in FIGS. 10A-10C, an elastic member 70 having a circular cylindrical wall 71 for sealing over the mouth of a tubular member 72 having a circular cylindrical exterior wall surface 73. A sleeve 74 having a circular cylindrical interior surface 75 and a non-circular cylindrical exterior surface 76 is provided for insertion between members 70 and 72. The non-circular cylindrical exterior surface 76 serves to stretch member 70 a greater amount along an axis a than an axis b. The non-uniform stress thus created in member 70 serves to elongate and close a perforation 77 in member 70 in the direction of axis a.

In each of the above described embodiments, the non-uniform stress is generated generally in a plane substantially normal to a longitudinal axis of the respective sealing members. This axis is typically coincident with the axis of penetration of the members by a penetrating instrument. In some cases, where the axes are not typically coincident, it may be desirable to generate a more complex array of unequal forces by using elastic sealing members, sleeves and tubular members of irregular and non-cylindrical facing surface configurations. This will insure distortion and elongation of an aperture created by a penetrating instrument without regard to the direction of the axis of penetration.

While described with respect to its use in a tubular member such as comprises a hub portion of a flexible catheter placement unit, it is apparent that the present invention may be incorporated in any device, such as a tube or the mouth of a bottle with which it is desired to use a penetrable sealing member. It is also apparent that other means such as epoxy may be used to fix the sealing member in position. Accordingly, the invention is not intended to be limited to the illustrative embodiments herein described but only as hereinafter claimed.

What is claimed is:

1. In a method wherein a penetrating instrument is caused to pierce a solid wall of an elastic sealing member and wherein said instrument causes a perforation in said wall, the improvement comprising the steps of:

generating a first force of a first magnitude in said sealing member along a first axis of said member and generating a second force of a second magnitude in said sealing member along a second axis of said member, said second axis being angularly displaced from said first axis, said first and said second forces serving to generate in said sealing member a greater stress along said first axis than along said second axis for closing said perforation caused by said penetrating instrument when said instrument is withdrawn from said member.

2. A method according to claim 1 comprising the step of:

generating said first and said second forces in a plane substantially normal to the axis of penetration of said sealing member by said penetrating instrument.

3. A method according to claim 2 comprising the steps of:

forming said sealing member with a first surface having a first geometrical surface configuration; and placing said first surface of said sealing member against a second surface in facing relationship of a second member, said second surface having a second geometrical surface configuration different from said first for generating said first and said second forces in said sealing member.

4. A method according to claim 3 wherein said first geometrical surface configuration is circular and said second geometrical surface configuration is non-circular.

5. A method according to claim 3 wherein said first and said second forces are compressive.

6. A method according to claim 3 wherein said first and said second forces are tensile.

7. A method according to claim 3 wherein said first and said second forces are compressive, said second member is a member having a passageway to be sealed and said second surface is a portion of an interior wall surface of said passageway in said second member, and wherein said second surface in cooperation with said first surface serves to generate said compressive forces in said sealing member.

8. A method according to claim 7 wherein said second member is a sleeve.

9. A method according to claim 3 wherein said first and said second forces are tensile, said second member is a member having a passageway to be sealed and said second surface is a portion of an exterior wall surface about said passageway in said second member, and wherein said second surface in cooperation with said first surface serves to generate said tensile forces in said sealing member.

10. A method according to claim 9 wherein said second member is a sleeve.

11. In a resealable fluid delivery apparatus including a penetrable elastic sealing member having a wall surface of a first configuration, an instrument for penetrating a solid wall of said sealing member and wherein said instrument causes a perforation in said sealing member, the improvement comprising:

a means for distorting said elastic sealing member until said wall surface assumes a second geometrical configuration for generating a first force along a first axis in said sealing member and a second force along a second axis in said sealing member for closing said perforation in said sealing member upon withdrawal of said penetrating instrument therefrom, said first and said second forces serving to generate in said sealing member a greater stress in a direction angularly displaced relative to said perforation in said sealing member.

12. An apparatus according to claim 11 wherein said first and said second forces are generated in a plane substantially normal to the axis of said perforation.

13. An apparatus according to claim 11 wherein said distorting means comprises:

a passageway in said apparatus for receiving said sealing member, said passageway having a wall surface of said second geometrical configuration facing in sealing relationship said wall surface of said sealing member.

14. An apparatus according to claim 11 wherein said apparatus has a passageway and said distorting means comprises:

a sleeve inserted between said passageway and said sealing member for receiving said sealing member, said sleeve having a wall surface of said second geometrical configuration in facing relationship with the wall surface said sealing member of said first geometrical configuration.

15. An apparatus according to claim 11 wherein said first and said second forces are compressive.

16. An apparatus according to claim 11 wherein said first and said second forces are tensile.

* * * * *